United States Patent [19]
Wilkerson

[11] 3,946,242
[45] Mar. 23, 1976

[54] GEOPHYSICAL ENERGY SOURCE UTILIZATION CIRCUIT

[76] Inventor: Alan W. Wilkerson, 410 Madero Drive, Thiensville, Wis. 53092

[22] Filed: Mar. 3, 1975

[21] Appl. No.: 554,972

[52] U.S. Cl................. 307/45; 290/4 R; 307/75; 321/44; 322/2 R
[51] Int. Cl.²................ F03D 9/00; H02J 3/40
[58] Field of Search ............ 290/44, 55, 4 R; 307/1, 307/2, 4, 19, 22, 23, 26, 29, 45, 64, 72–76; 322/2 R; 321/16, 18, 44, 45 R; 323/1, 3, 5, 16, 19, 22 SC

[56] References Cited
UNITED STATES PATENTS
3,895,236  7/1975  Herron............................ 290/44 X

*Primary Examiner*—A. D. Pellinen
*Attorney, Agent, or Firm*—Andrus, Sceales, Starke & Sawall

[57] ABSTRACT

A conversion means converts the energy available from a source, such as the wind or sun, into a corresponding amount of d.c. electrical power. A switching circuit, typically a thyristor bridge, is connected between the conversion means and an a.c. load and across a.c. power mains energizing the load. The switching circuit is operable to periodically connect the conversion means to the a.c. load in a power supplying manner. The a.c. mains impart suitable voltage and frequency characteristics to the electrical power so supplied. In the event the supplied power exceeds the power required by the a.c. load, the difference is taken by the a.c. power mains.

46 Claims, 20 Drawing Figures

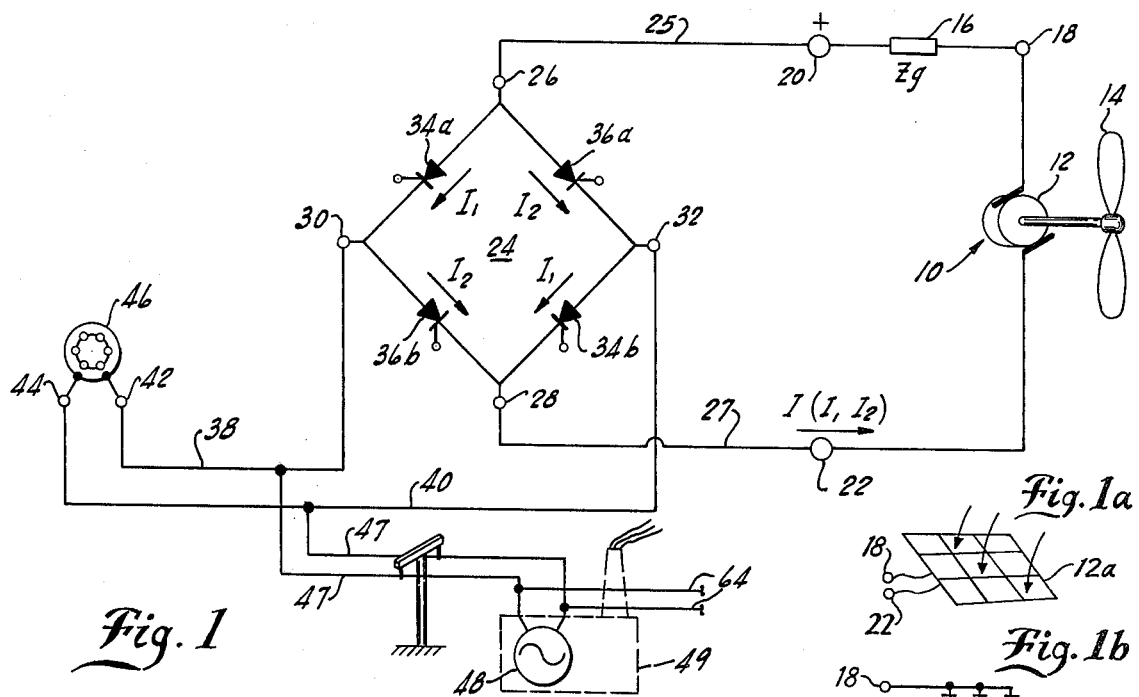
Fig. 1
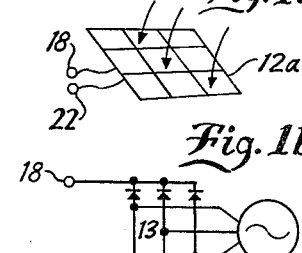
Fig. 1a
Fig. 1b
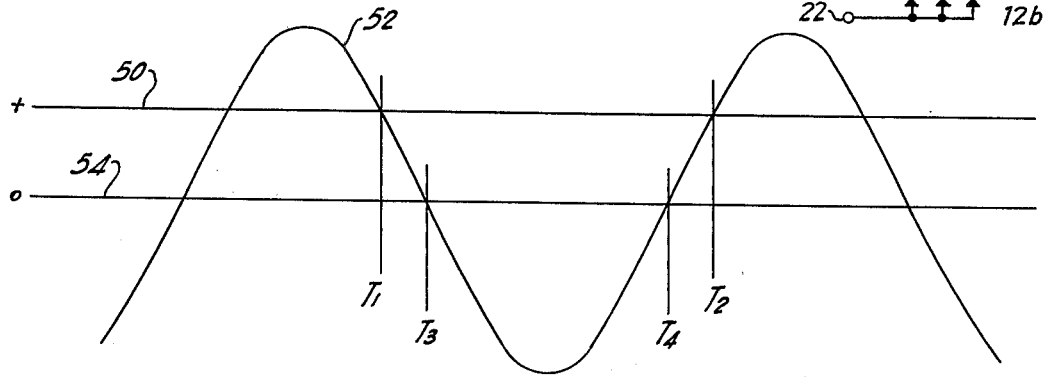
Fig. 2
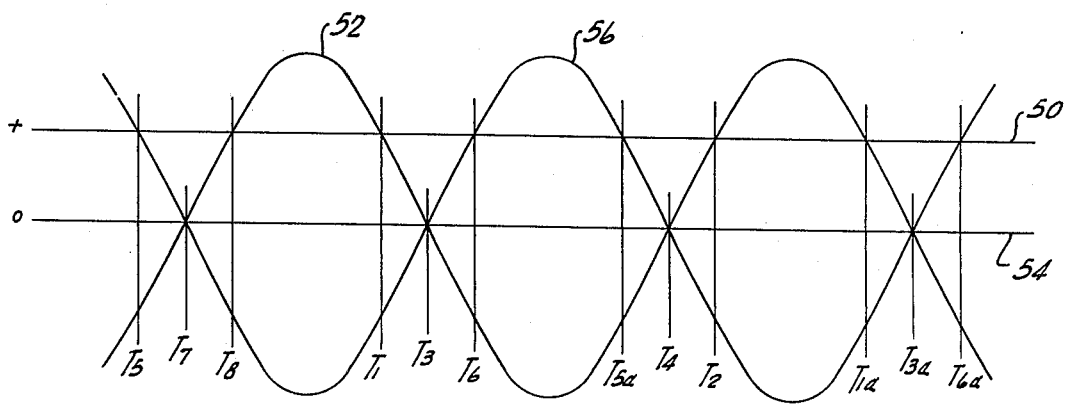
Fig. 3

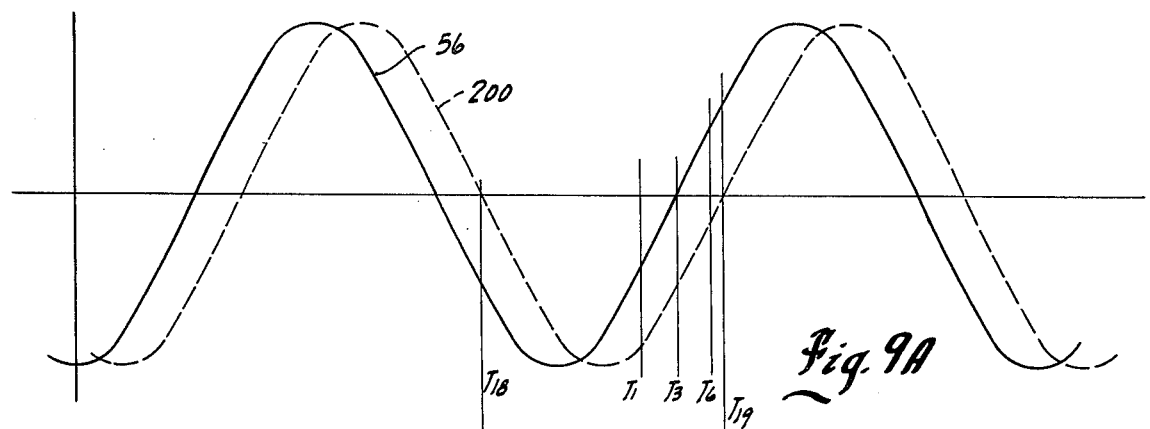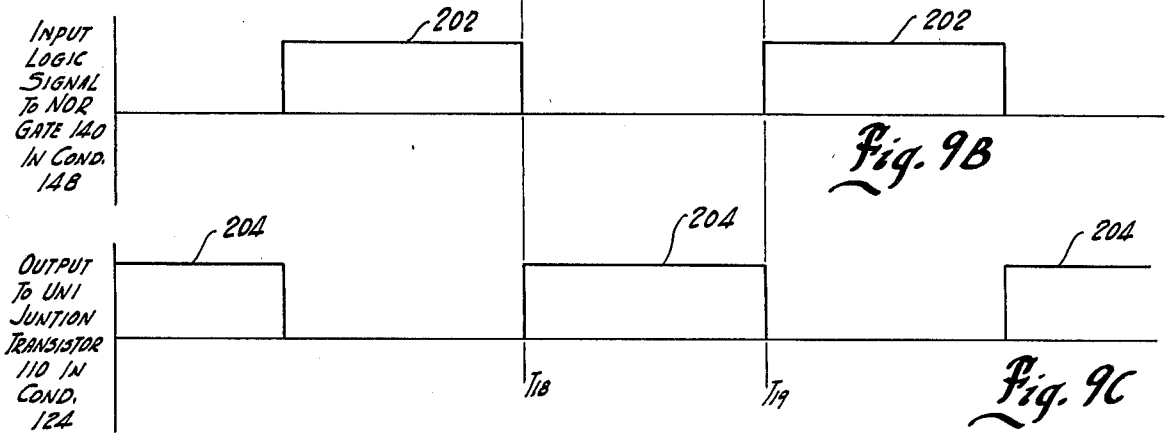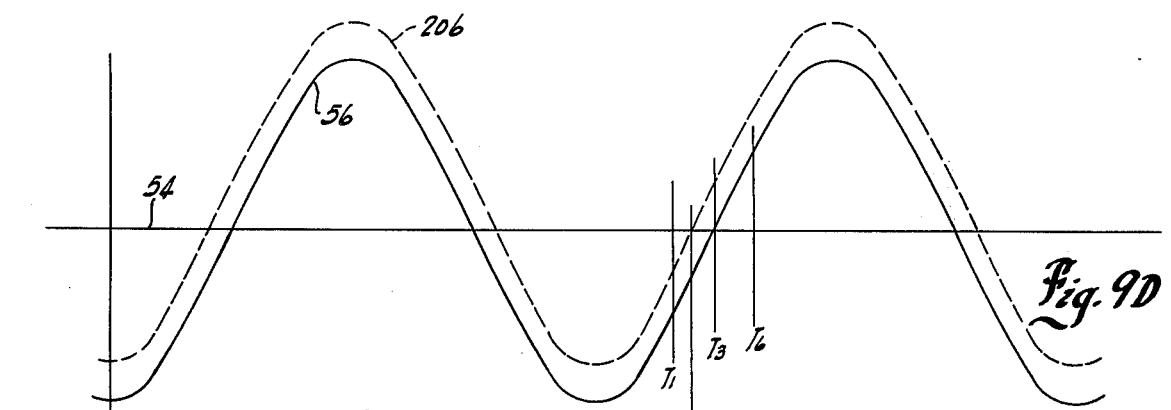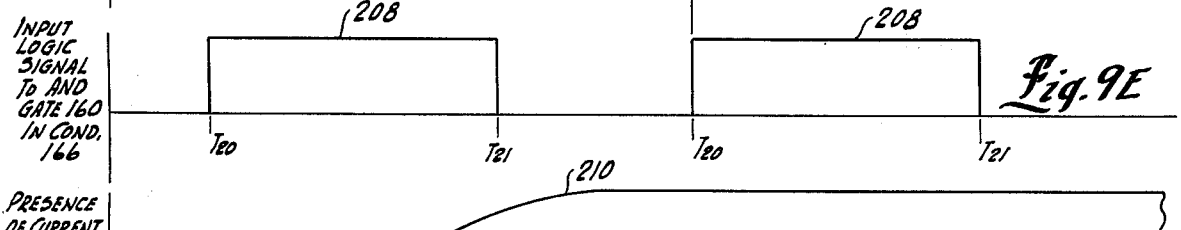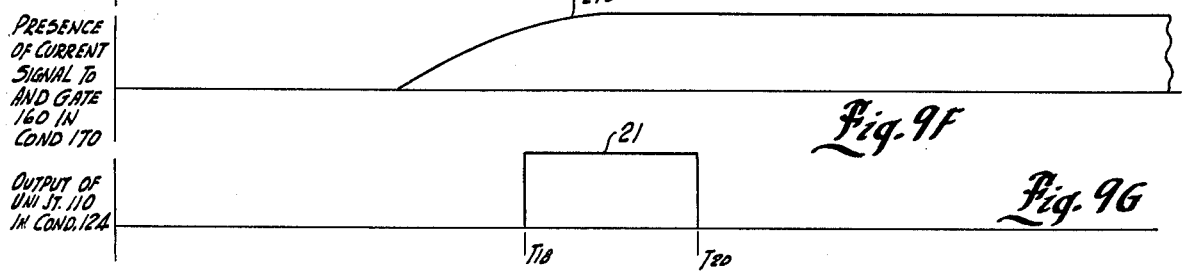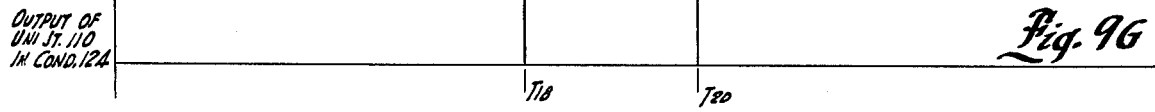

GEOPHYSICAL ENERGY SOURCE UTILIZATION CIRCUIT

BACKGROUND OF THE INVENTION

1. Field of the Invention

The present invention relates to circuitry which enables geophysical energy such as the sun and the wind to provide electrical power.

2. Description of the Prior Art

Many inexpensive and readily available sources of energy exist. These include such sources as solar radiation, wind producing atmospheric pressure and temperature gradients, stored or flowing water, and others. While it has long been desired to utilize such sources to augment conventional energy supplies, the sun and the wind remain essentially unused for this purpose today. This is attributable, at least in part to the following circumstances.

The energy of sources typified by the sun, wind, and water is seldom directly utilizable by the oridinary power consumer. For this reason, the energy of such sources is often converted to electrical power. However, to achieve any significant degree of utilization, it is further necessary to establish the voltage and frequency of the converted power at conventional standards, such as 60 Hz and 110 or 220 volts. Heretofore, this transformation to useful voltages and frequencies has been both expensive and inefficient, thereby detracting from the feasibility of using these types of energy sources.

In addition to the problems of power transformation, the amount of energy available from these sources is variable, dependent on external factors not related to the amount of energy required by the users. For example, the energy available from solar radiation is dependent on the time of day, the season, the amount of cloud cover, etc. The amount of wind energy available depends on a host of geophysical factors.

Effective utilization of the energy from sources of the type noted above has thus required the storage of energy during periods when the available energy exceeds energy demands and the release of stored energy when the available energy is less than that required. This load matching may be accomplished by the use of storage batteries, the electrolysis of water and other means. However, provision of the required storage means introduces additional expense and inefficiencies which further detract from the feasibility of using these energy sources.

SUMMARY OF THE PRESENT INVENTION

The novelty of the present invention resides in the use of the conventional, existing, a.c. power distribution network to facilitate both the power transformation and load matching required to utilize the energy of sources such as the sun and wind. The simplicity, economy, and efficiency introduced by the present invention greatly enhances the practicality of using these energy sources.

In the present invention the energy of the variable source is converted into a corresponding amount of d.c. electrical power. This power is periodically supplied to an a.c. load energized by the a.c. power network. The a.c. voltages existing in the a.c. power network are employed to control the power transfer and to transform the power into the same voltage and frequency as exists in the a.c. power network which energizes the a.c. load. The transformation process is thus simplified and rendered highly efficient and economical.

The present invention further contemplates the use of the a.c. power distribution network as a receiving and redistribution medium for excessive quantities of transformed electrical power. This enables the use of a variable energy source without the need for expensive, inefficient storage means, such as batteries and the like. Both the generation and the redistribution of electrical power from the geophysical energy source lessens power demands on power stations in the a.c. power network, resulting in a reduction in the amount of conventional fuels consumed.

The conversion means for converting the variable energy of the source into a corresponding amount of d.c. electrical power may, for example, comprise a d.c. generator driven by a windmill. A switching means, typically a thyristor bridge, is interposed between this d.c. power supply and the a.c. load. The switching means is also connected across the a.c. power mains of the distribution network which energize the load. The switching means is operable to periodically connect the d.c. power supply to the a.c. load. The voltages of the d.c. power supply and the a.c. power mains provide a power supplying current flow from the d.c. power supply through the switching means to the a.c. load and impart suitable voltage and frequency characteristics to this power.

In the event the amount of d.c. power is available is less than that required by the a.c. load, the a.c. power mains provide the necessary difference. If the d.c. power available from the d.c. power supply is greater than that required by the a.c. load, the excess flows into the a.c. power distribution network for supply to other a.c. loads connected in the network.

BRIEF DESCRIPTION OF THE DRAWINGS

The invention may be more fully understood with reference to the drawing in which:

FIG. 1 is a schematic diagram of one embodiment of the geophysical energy source utilization circuit of the present invention employing wind energy.

FIG. 1a is a schematic diagram of solar powered conversion means suitable for use in the circuit of FIG. 1.

FIG. 1b is a schematic diagram of an alternator - rectifier conversion means suitable for use in the circuit of FIG. 1.

FIG. 2 shows the d.c. voltage and one of the a.c. voltages existing in the circuit of FIG. 1;

FIG. 3 is similar to FIG. 2 and further shows an additional a.c. voltage existing in the circuit of FIG. 1;

FIGS. 9A through 9G show various electrical signals employed in the operation of the thyristor firing circuit of FIG. 8;

DESCRIPTION OF THE PREFERRED EMBODIMENT

THE CIRCUITRY

Figure 4:
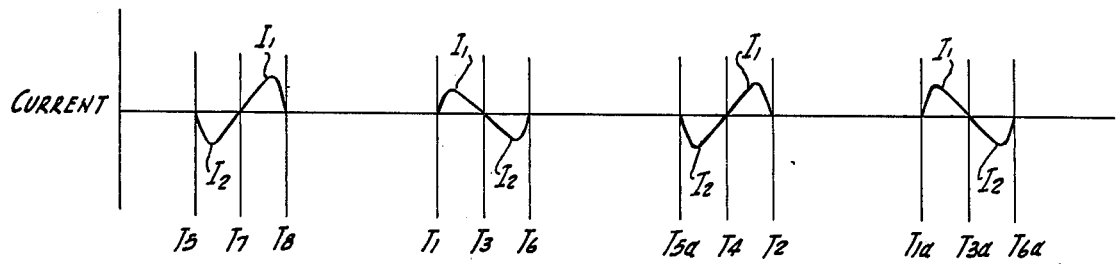
FIG. 4 shows currents existing in the circuit of FIG. 1.

In FIG. 1, conversion means 10 is operable by the energy source. The conversion means includes d.c. power supply 12, shown as a d.c. generator in FIG. 1 operated by windmill 14. It will be appreciated that d.c. power supply 12 may comprise the array of sun powered solar cells 12a shown in FIG. 1a or other means responsive to the energy of the source. D.c. power supply 12 provides variable amounts of d.c. electrical power corresponding in quantity to the variable energy available from a source such as the sun or wind. D.c. power supply 12 includes internal impedance 16 connected between voltage source terminal 18 and output terminal 20. D.c. supply 12 includes a second output terminal 22.

A switching means 24 is coupled to d.c. power supply output terminals 20 and 22. The switching means may typically comprise a thyristor bridge having input terminals 26 and 28 and output terminals 30 and 32. Input terminals 26 and 28 are connected to d.c. power supply output terminals 20 and 22 via conductors 25 and 27. Each of the input terminals of the bridge is connected to each of the output terminals by bridge arm conductors containing thyristors to provide a pair of conduction paths in thyristor bridge 24 between input terminals 26 and 28 and output terminals 30 and 32. One such conduction path includes thyristors 34a and 34b while the other conduction path includes thyristors 36a and 36b. Thyristors 34a and 34b and 36a and 36b are fired by firing circuit 100 shown in detail in FIGS. 8 and 9.

In the d.c. portions of the circuitry of FIG. 1, current flows in the counter clockwise direction shown by the arrow labelled I. This current is made up of the currents in the two conduction paths in the thyristor bridge 24. Thyristors 34a, and 34b and 36b are poled so that this current alternates between the a and 36b conduction paths in thyristor bridge 24. Current $I_1$ in the conduction path containing thyristors 34a and 34b flows out terminal 30 and in terminal 32. Current $I_2$ in the conduction path containing thyristors 36a and 36b flows out terminal 32 and in terminal 30.

Output terminals 30 and 32 of thyristor bridge 24 are connected via conductors 38 and 40 to terminals 42 and 44 of a.c. load 46, shown as an induction motor in FIG. 1. A conventional a.c. power distribution network is also connected to conductors 38 and 40 and hence to thyristor bridge 24 and a.c. load 46. Such a network may comprise a.c. power mains 47 connected to a.c. generator 48 in power station 49. A.c. power mains 47 and the power distribution network have a characteristic low impedance property which tends to maintain terminal voltages regardless of the magnitude of currents in the mains. This property renders the mains relatively immune to the effects of removing or inserting power and may be said to impart a "stiffness" to the mains.

THE OPERATION OF THE CIRCUITRY

The Supply of Power from D.C. Supply 12 to A.C. Load 46

Inasmuch as the operation of the circuitry of FIG. 1 involves the supply and receipt of electrical power, it is important to note the common analytical convention regarding this matter. This convention states that for an element to be a source of electrical power, current must flow out the more positive terminal of the element and in the less positive or negative terminal. For an element to function as an electrical load, current must flow in the more positive terminal of the element and out the less positive or negative terminal.

FIG. 2 shows certain voltages existing in the circuitry of FIG. 1 during its operation. Voltage 50 represents the voltage of d.c. power supply 12 applied to terminal 20. For d.c. power supply 12 to function as an electrical source with the counter-clockwise current flow direction of current I indicated in FIG. 1, the voltage at terminal 20 must be of the positive polarity shown in FIGS. 1 and 2.

A.c. power mains 47 apply an a.c. voltage to output terminals 30 and 32 of thyristor bridge 24. When thyristors 34a and 34b are conducting current $I_1$, this voltage will appear at input terminals 26 and 28 of thyristor bridge 24 as a.c. voltage 52 due to the negligible conduction voltages across thyristors 34a and 34b. A.c. voltage 52 also appears at output terminals 20 and 22 of d.c. pwer supply 12. A.c. voltage 52 periodically varies from zero to a maximum magnitude of one voltage polarity and through zero to a maximum magnitude in the other polarity In comparing the magnitudes of d.c. voltage 50 generated by d.c. power supply 12 and a.c. voltage 52 existing at a.c. load 46 and established by a.c. mains 47, there will exist periods during which the alternating voltage will be less positive than the d.c. voltage, due to the varying magnitude of the a.c. voltage. Such a period exists from time $T_1$ to time $T_2$ in FIG. 2.

Inasmuch as electrical current flows from a more positive voltage level to a less positive voltage level, current can be made to flow from the d.c. power supply 12 to a.c. load 46 during this and similar periods. Thyristors 34a and 34b in thyristor bridge 24 are poled to facilitate this current flow. In order to form a current conduction path, the anodes of the thyristors must be more positive than the cathodes. As may be seen from FIG. 2, this condition will occur during the aforementioned time interval $T_1 - T_2$ in which d.c. voltage level 50 is instantaneously more positive than the a.c. voltage level. During this time interval, for example, d.c. voltage 50 at terminal 20 applied to the anode of thyristor 34a will be more positive than the a.c. voltage 52 at terminal 30 applied to the cathode, permitting thyristor 34a to conduct current $I_1$ from output terminal 20 of d.c. power supply 12 to terminal 30, conductor 38, and terminal 42 of load 46.

Under the conditions shown in FIG. 2, in which the magnitude of d.c. voltage 50 is less than the peak magnitude of a.c. voltage 52, the d.c. voltage 50 applied to the anode of thyristor 34a prior to time $t_1$ and subsequent to time $T_2$ is less positive than a.c. voltage 52 applied to the cathode, preventing conduction of thyristor 34a during these times. Corresponding conduction controlling conditions exist on thyristor 34b.

It is important to note that the bi-polarity character of the a.c. voltage makes both polarities of voltage available during the time period $T_1 - T_2$. Both bridge terminals 30 and 32 and load terminals 42 and 44 are connected across a.c. mains 47 by conductors 38 and 40. Bridge terminal 38 and 40. Bridge terminal 30 and load terminal 42 will thus simultaneously be of the same polarity by virtue of their connection to conductor 38. By proper selection of the voltage on the bridge terminals and the load terminals, electrical power may be transferred by the current flow from d.c. power supply 12 to a.c. load 46. As shown in FIG. 2, during time period $T_1 - T_3$ alternating voltage 52 on terminal 30 of thyristor bridge 24 and terminal 42 of a.c. load 46, while lesser in magnitude than d.c. voltage 50, is, nonetheless, positive with respect to neutral axis 54. Current I ($I_1$) is flowing out a positive terminal 30 of thyristor bridge 24 and in a positive terminal 42 of a.c. load 46. In accordance with the analytical power convention noted above, when current flows out the positive terminal of an element, the element is an electrical source. D.c. power supply 12 and thyristor bridge 24 are thus an electrical power source. When current flows in the positive terminal of an element, the element is an electrical load. A.c. load 46 is thus an electrical load receiving power from d.c. supply 12.

It is also important to note that at $T_3$, the polarity of the a.c. voltage at terminal 30 of thyristor bridge 24 and terminal 42 of a.c load 46 reverses to the negative polarity. If the flow of current $I_1$ continues through thyristor 34a and in conductor 38, it will be flowing out a terminal of thyristor bridge 24 which is instantaneously negative. In accordance with the convention noted above, when current flows out the negative terminal of an element, the element is a load. Thus, if the conduction of thyristors 34a and 34b is permitted subsequent to time $T_3$, conductors 38 and 40 connected to a.c. power mains 47 become a source supplying power to d.c. power supply 12. Under such conditions, thyristor bridge 24 operates in the manner of a conventional rectifier. Therefore, in order to insure the flow of power in the direction from d.c. power supply 12 to a.c. load 46, it is necessary to turn off thyristor 34a at or prior to time $T_3$.

In summary, in order to obtain a supply of power from d.c. power supply 12 to a.c. load 46, thyristor 34a must be rendered conductive at or after time $T_1$ and turned off at or before time $T_3$. While thyristor 34a has been described in detail above, it will be appreciated that complementary thyristor 34b must be rendered conductive in co-ordination with thyristor 34a in order to complete the conduction path through thyristor bridge 24.

Circumstances similar to those existing during time $T_1 - T_3$ exist between times $T_4$ and $T_2$ when a.c. voltage 52 returns to the positive polarity but is smaller in magnitude than d.c. voltage 50. If thyristors 34a and 34b are rendered conductive during this time interval, the supply of power from d.c. power supply 12 through thyristor bridge 24 to a.c. load 46 will again result.

FIG. 3 is similar to FIG. 2 and further shows a.c. voltage 56 which appears at input terminals 26 and 28 of bridge 24 and output terminals 20 and 22 of d.c. power supply 12 when thyristors 36a and 36b conduct current $I_2$. The action of thyristors 34a and 34b and thyristors 36a and 36b in establishing the pair of a.c. voltages 52 and 56 shown in FIG. 3 may be considered analogous to the operation of a reversing switch in performing the same function. Thyristors 36a and 36b will be biased to conduct current $I_2$ for periods extending from time $T_5$ to time $T_6$ and time $T_{5a}$ to time $T_{6a}$ shown in FIG. 3. The supply of power from d.c. power supply 12 through thyristors 36a and 36b in thyristor bridge 24 to a.c. load 46 occurs during time periods $T_5 - T_7$, $T_3 - T_6$, $T_{5a} - T_4$, and $T_{3a} - T_{6a}$.

It will be apparent from FIG. 3 that when considering both pairs of thyristors and current conduction paths in thyristor bridge 24, time periods $T_1$ through $T_6$, $T_{5a}$ through $T_2$ and $T_{1a}$ through $T_{6a}$ are periods during which a power supplying current I, comprised of the current components $I_1$ and $I_2$, may flow from d.c. supply 12 through thyristor bridge 24 to a.c. load 46. FIG. 4 shows these currents under conditions in which low inductive impedance is present in the circuitry. With greater inductive impedance, the current flow intervals will increase and current flow may become continuous.

Any difference between the amount of power supplied by d.c. power supply 12 during such power supplying periods and that required by a.c. load 46 is accommodated by a.c. power mains 47. In the instance in which the power required by a.c. load 46 is in excess of that supplied by d.c. power supply 12, a.c. power mains 47 provide an input power equal to the difference.

Figure 5:
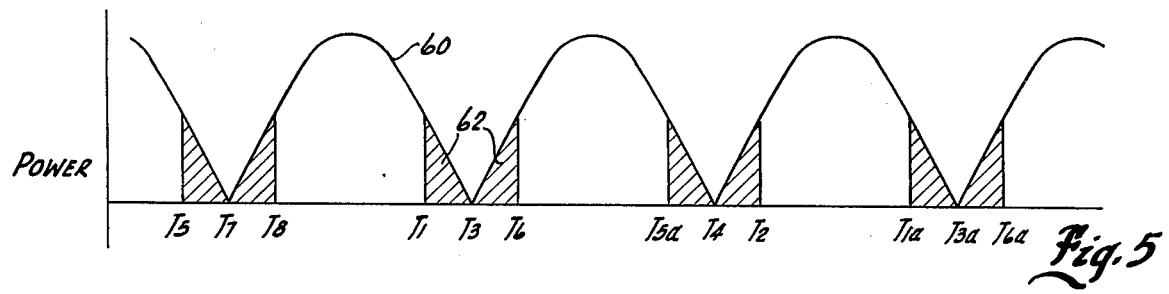
FIG. 5 shows the operation of the circuit of FIG. 1 in providing power to a load.

FIG. 5 shows the power supplying operation of the present invention. The graph shows the power utilized by a.c. load 46. The shaded areas 62 occupying times $T_5 - T_8$, $T_1 - T_6$, $T_{5a} - T_2$, and $T_{1a} - T_{6a}$ indicate the power supplied by d.c. power supply 10. In FIG. 5, the amount of power supplied during these time periods is shown as equal to that required by a.c. load 46. The power requirement of a.c. load 46 during the time periods $T_8 - T_1$, $T_6 - T_{5a}$, and $T_2 - T_{1a}$ is provided by a.c. lines 47. FIG. 5 also illustrates the action of the a.c. power mains 47 in imparting suitable voltage and frequency to the power 62 supplied by a.c. power supply 12 to a.c. load 46.

CONSIDERATIONS IN THE OPERATION OF SWITCHING MEANS 24 DURING POWER SUPPLY

On a theoretical basis, to provide the maximum supply of power from d.c. power supply 12 to a.c. load 46, thyristors 34a and 34b in bridge 24 should be turned on at time $T_1$ and turned off at $T_3$. Thyristors 36a and 36b in bridge 24 should be turned on at time $T_3$ and turned off at time $T_6$. This would supply power during the entire time period $T_1 - T_6$ during which the a.c. voltages 52 and 56 are positive in polarity but smaller in magnitude than d.c. voltage 50.

As a practical matter, however, in a bridge, such as bridge 24, utilizing thyristors as the current control devices, consideration should be given to using only thyristors 36a and 36b and the time period $T_3 - T_6$, to supply power rather than utilizing the entire time period $T_1 - T_6$ and both sets of thyristors 34a and 34b and 36a and 36b. While the amount of power supplied to a.c. load 46 is reduced, the ease and certainty with which the operation, particularly the turn off operation, of the thyristors may be achieved and the facility with which the magnitude of the current I may be controlled is increased.

With the use of thyristors 36a and 36b to supply power during the period $T_3 - T_6$, the thyristors are automatically biased toward the nonconductive condition at time $T_6$ as the relative polarity of the voltages on the anodes and cathodes of the thyristors reverses. The control of the magnitude of the current $I_2$ conducted by thyristors 36a and 36b is simplified both by the automatic turn off of the thyristors and by the decreasing difference in bias voltages applied to the thyristors during the time period $T_3 - T_6$.

In contrast, the difference in the biasing voltages applied to thyristors 34a and 34b during the time period $T_1 - T_3$, is such as to tend to increase conduction and the current $I_1$ through the thyristors. This presents problems in effecting turn off of thyristors 34a and 34b at time $T_3$. The attendant limitations in the firing point of the thyristors, as well as the biasing voltages make control of the magnitude of current through the thyristors difficult. A more serious problem is that should the turn off of thyristors 34a and 34b not be completed by time $T_3$, it may be impossible to thereafter turn them off and turn thyristors 36a and 36b on due to the more favorable conduction conditions existing on thyristors 34a and 34b subsequent to time $T_3$.

Figure 6:
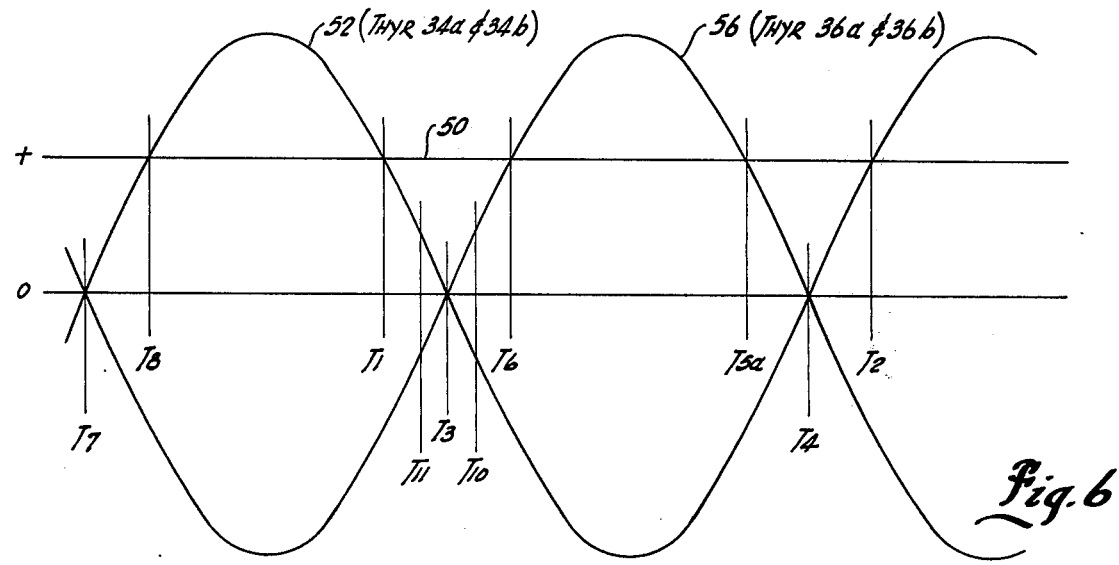
FIG. 6 shows the voltages of FIG. 3 on an expanded scale.

Referring to FIG. 6, which shows the portion of FIG. 3 containing the time period $T_1 - T_6$ on an expanded scale, consider circumstances existing at time $T_{10}$ with thyristors 34a and 34b still conducting. Time $T_{10}$ is subsequent to time $T_3$ and, therefore, the voltage on terminal 32 is instantaneously positive and the voltage on terminal 30 is instantaneously negative. This is represented in FIG. 6 by the voltages 52 and 56. Terminal 28 will be at the same potential as terminal 32 since conductive thyristor 34b, to that anode of which is applied the positive voltage 56, has a negligible voltage drop across it. Thyristor 36b thus has the positive potential at terminal 28 applied to its cathode and the negative potential at terminal 30 applied to its anode. It is therefore reverse biased and cannot be rendered conductive. A similar circumstance exists in connection with thyristor 36a so that if the conduction of thyristors 34a and 34b continues past time $T_3$, as to $T_{10}$, it will be impossible to turn on thyristors 36a and 36b. The current flow through thyristors 34a and 34b subsequent to time $T_3$ causes an undesirable power flow from a.c. power mains 47 to d.c. power supply 12. This power flow will continue until time $T_2$. It is to avoid this inability to turn on thyristors 36a and 36b and turn off thyristors 34a and 34b that only thyristors 36a and 36b are employed to conduct current during the portion $T_3 - T_6$ of the time interval $T_1 - T_6$.

In the subsequent power supply time interval $T_{5a} - T_2$ the relative polarities of a.c. voltages applied to output terminals 30 and 32 of bridge 24 are reversed so that thyristors 34a and 34b are rendered conductive during the portion $T_4 - T_2$ of the time interval $T_{5a} - T_2$ and thyristors 36a and 36b are not used.

In spite of the deliberate use of only one of the pairs of thyristors, for example thyristors 36a and 36b, during the latter portion, $T_3 - T_6$, of the power supplying interval, $T_1 - T_6$, there is always the possibility that the other pair of thyristors will be conducting in the power supplying interval. This may be due to the presence of a large inductance in the circuit. For example, the current maintaining properties of the inductance may cause the current flowing in thyristors 34a and 34b during a previous power supplying interval $T_7 - T_8$ to continue past $T_1$ of the subsequent power supplying interval $T_1 - T_6$. However, as long as thyristors 36a and 36b are fired on prior to time $T_3$ thyristors 34a and 34b will be commutated off by the voltage conditions existing in thyristor bridge 24 prior to time $T_3$. These conditions favor the conduction of thyristors 36a and 36 b over the conduction of thyristors 34a and 34b.

Consider, for example, time $T_{11}$ in FIG. 6 which is prior to time $T_3$ under conditions in which thyristors 34a and 34b are conducting. At time $T_{11}$ the voltage on terminal 30 is positive and the voltage on terminal 32 is negative. Conducting thyristor 34b applies the negative voltage at terminal 32 to terminal 28 and places that terminal at the same negative potential as terminal 32. Thyristor 36b thus has a negative potential on its cathode and the positive potential at terminal 30 on its anode. It is therefore forward biased and can be easily rendered conductive by an appropriate firing signal. The conduction of thyristor 36b commutates off thyristor 34b by providing the positive voltage at terminal 30 to its cathode.

The foregoing suggests that under circumstances in which thyristors 34a and 34b continue to conduct current past time $T_1$, that thyristors 36a and 36b must be fired prior to time $T_3$ if proper operation on bridge 24 is to be maintained.

While theoretically a small amount of power supply from a.c. power mains 47 to d.c. power supply 10 will result by the conduction of current through thyristors 36a and 36b prior to time $T_3$, no significant amount of reverse power flow occurs if firing occurs close to time $T_3$. The initial current build up is very slow with the inductive impedance found in a typical electromechanical conversion means 12. This also reduces the amount of reverse power flow. Thyristors 36a and 36b will normally be commutated off at time $T_6$ as the voltage applied to the tyristors reverses to a condition not favoring conduction. If the inductive properties of the circuitry continue current flow through the thyristors past this turn-off time the current is quite effective in supplying power to a.c. load 46 because of the voltages existing subsequent to time $T_6$. Thus, any power flow from a.c. power mains 47 to d.c. power supply 10 occurring by firing the thyristors 36a and 36b prior to time $T_3$ tends to be regained by the conduction of current subsequent to time $T_6$. If inductive impedance is present, there is also the additional advantage in that the RMS currents tend to be lower because of the longer conducting interval which extends from prior to time $T_3$ to subsequent to time $T_6$.

Figure 7:
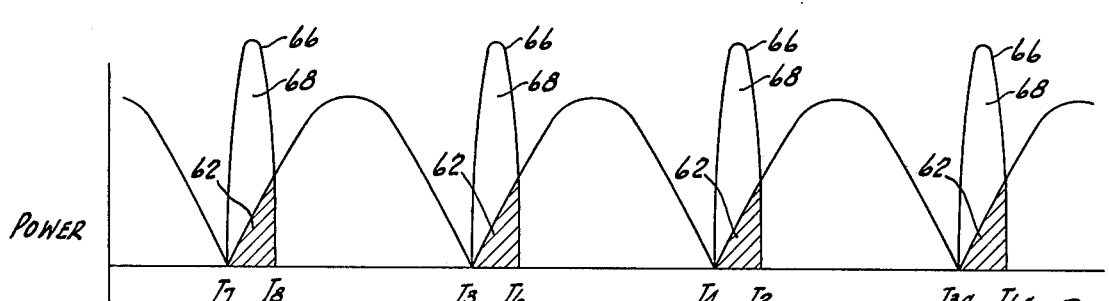
FIG. 7 shows a modification in the operation of the circuit of FIG. 1 in providing power to the load.

The supply of power to a.c. load 46 through the use of the latter portion of the power supplying intervals is shown in FIG. 7. FIG. 7 also shows conditions in which the amount of power provided by d.c. power supply 10 exceeds that required by a.c. load 46. The numeral 66 indicates the total amount of power supplied by the current flow occuring during the power supplying time intervals. The numeral 62 indicates the portion of the supplied power concurrently used by a.c. load 46. The numeral 68 indicates the remaining excess portion of the supplied power which is taken or stored in the a.c. power distribution network. This excess power may be returned to a.c. load 46 in the time periods subsequent to times $T_8$, $T_6$, $T_2$, and $T_{6a}$.

The amount of power supplied to a.c. load 46 is determined both by the level of d.c. voltage 50 and the firing angles of the thyristors in bridge 24. The level of d.c. voltage is determined by the speed of windmill 14 and the field strength of d.c. generator 12. With the windmill at maximum speed, the field strength may be set so that d.c. voltage 50 is approximately 90 percent of the RMS value of the a.c. voltage. Considerations relating to the firing angle of the thyristor in bridge 24 are described above.

In the instance in which d.c. power supply 13 provides more power than is required by a.c. load 46, the excess power in a.c. power mains 47 may be supplied to other users connected to the a.c. power distribution network, for example, users connected to power mains 64, thereby reducing the power generating requirements of power station 49.

THE FIRING CIRCUIT

Figure 8:
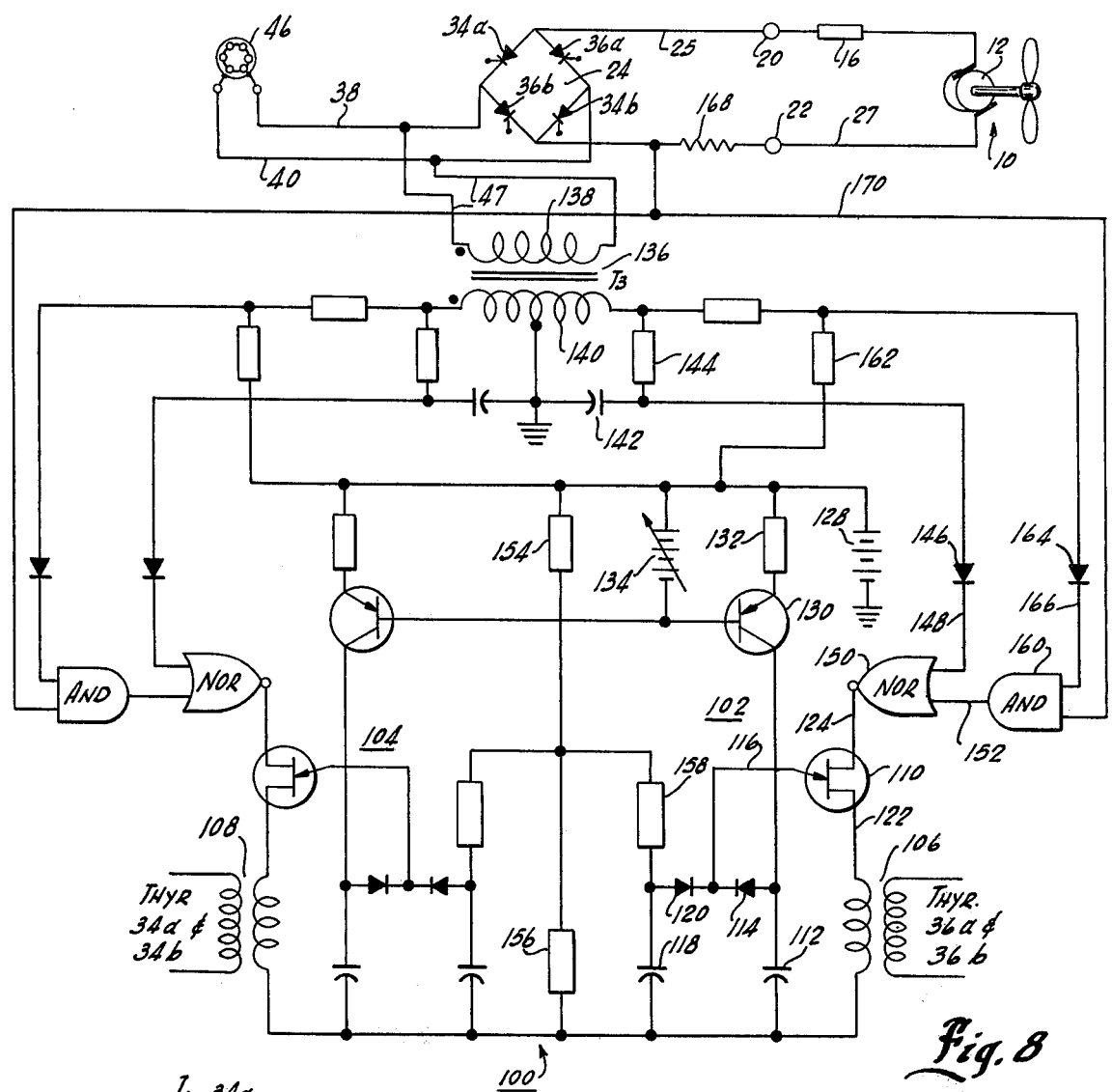
FIG. 8 is a schematic diagram of a thyristor firing circuit suitable for use in the circuit of FIG. 1.

FIG. 8 shows a firing circuit 100 suitable for firing thyristors 34a and 34b and thyristors 36a and 36b to accomplish the above described operation. Firing circuit 100 includes a pair of firing pulse generators 102 and 104. Firing pulse generator 102 is coupled through pulse transformer 106 to the gate terminals of thyristors 36a and 36b. The firing pulse genrator 104 is coupled through pulse transformer 108 to the gate terminals of thyristors 34a and 34b.

The pulse generators 102 and 104 are generally similar in construction and employ a unijunction transistor pulse generating circuit. A unijunction transistor is a three element semi-conductor device having a pair of base terminals and an emitter terminal. If the voltage on the emitter terminal is less than a predetermined peak voltage, only a small reverse leakage current will flow in the device. When the emitter voltage exceeds the peak voltage a low resistance path is established for the emitter current.

Unijunction transistors are commonly used in simple relaxation oscillators in which a capacitor, connected to the emitter terminal, is charged by a controlled current source. When the capacitor voltage reaches the peak emitter voltage, it triggers the unijunction transistor and the energy of the capacitor is discharged through the device to provide a thyristor gating pulse. Due to the similarity of the pulse generators 102 and 104, only pulse generator 102 is described in detail below.

Pulse generator 102 includes unijunction transistor 110. The emitter of unijunction transistor 110 is connected to triggering capacitor 112 through isolating diode 114 and conductor 116. A second triggering capacitor 118 is connected in parallel with capacitor 112 through isolating diode 120. One base of unijunction transistor 110 is connected to transformer 106 by conductor 122. The other base of unijunction transistor 110 is connected to the output of a logic circuitry, hereinafter described, by conductor 124. The logic circuitry determines the time interval during which unijunction transistor 110 may be triggered by capacitor 112.

Pulse generator 102 is energized by a d.c. power supply shown diagrammatically as battery 128. The emitter of transistor 130 is connected through bias resistor 132 to d.c. power supply 128. The collector of transistor 130 is connected to capacitor 112 to provide the charging current to the capacitor. The base of transistor 130 is connected to control signal source 134 which provides an adjustable magnitude control signal to the base of transistor 130. The magnitude of this signal determines the magnitude of the current supplied to capacitor 112, the charging rate of the capacitor, and the timing of pulse generation by unijunction transistor 110. The greater the magnitude of the control signal, the more rapid the charging of capacitor 116 and the earlier the triggering and pulse generation of unijunction transistor 110.

Step-down transformer 136 has primary winding 138 coupled to a.c. power mains 47 to provide voltages in secondary winding 140 suitable for synchronizing the operation of firing circuit 100 with conditions existing in thyristor bridge 24. The synchronizing voltages are applied to the logic circuitry which determines the period during which unijunction transistor 110 may be rendered operative.

Transformer 136 provides a voltage corresponding to voltage 56 in the right hand half of secondary winding 140, as shown in FIG. 9A. FIG. 9A also contains certain times such as $T_3$ and $T_6$ previously identified in FIGS. 2, 3 and 4. Voltage 56 is phase shifted in a lagging manner by capacitor 142 and resistor 144 to establish voltage 200 which is applied to diode 146. The diode 146 provides the positive half cycle of voltage 200 as logic input signal 202 shown in FIG. 9B. Inasmuch as it is the presence and absence of logic signal 202, not its magnitude which is important, logic input signal 202 is shown as a simple square wave.

Logic input signal 202 is supplied in conductor 148 to one input of NOR gate 150. A NOR gate is a coincident element which provides a logic 0 output (usually the absence of an electrical output signal) when an input signal having a logic state of 1 (usually the presence of an electrical signal) is applied to the first input, or the second input, etc., of the element. The name NOR gate is derived from the "not" or logic 0 characteristic of the output and the "or" characteristic of the input. When the input signals to a NOR gate are all logic 0, a logic 1 signal appears at the output thereof.

Disregarding, for the moment, the other input signal to NOR gate 150 in conductor 152, the absence of input logic signal 202 (i.e. logic 0) provides an output signal (i.e. logic 1), shown as signal 204 in FIG. 9C, from NOR gate 150 to unijunction transistor 110 in conductor 124 which biases unijunction transistor 110 into the operative state and permits it to generate a firing pulse when the appropriate voltage is applied to the emitter terminal thereof. The period during which unijunction transistor 110 may generate a firing pulse extends from time $T_{18}$ to time $T_{19}$, as shown in FIGS. 9A, B, and C. The firing interval for unijunction transistor 110 and hence for thyristors 36a and 36b thus commences when voltage 56 is somewhat negative and extends well into the positive half cycle. Typically the extension into the positive half cycle is about 50°. The operative period of unijunction transistor 110 thus embraces the time interval $T_3$ to $T_6$.

The exact instant of pulse generation during the time period $T_{18} - T_{19}$ depends upon the magnitude of the control signal from the control signal source 134. As a practical manner, pulse generation cannot be accomplished at time $T_{18}$ since it takes some time for capacitor 112 to charge to the voltage necessary to trigger unijunction transistor 110 so that the generation of a firing pulse and the firing of thyristors 36a and 36b is typically initiated sometime after the negative peak of voltage 56. The firing interval extends at least to time $T_6$.

As noted above, under circumstances in which current is flowing through thyristors 34a and 34b subsequent to time $T_1$, it is necessary to fire thyristors 36a and 36b prior to time $T_3$. This is particularly true if this current persists as time $T_3$ approaches. To insure generation of a firing pulse by unijunction transistor 110 under these circumstances, a logic input signal which alters its logic state shortly before time $T_3$ is established. This signal is used in conjunction with a logic signal indicating the presence of current in d.c. supply 10 to initiate firing signals to thyristors 36a and 36b prior to time $T_3$ if such a signal has not already been generated by the operation of control signal source 134. The required logic function is accompoished by AND gate 160. An AND gate is a coincident element which provides a logic 1 output signal when a logic 1 input is applied to its first input and its second input, etc.

The first logic input signal to AND gate 160 is generated from voltage 56 in the right hand half of transformer secondary winding 140. The wave form of this voltage is repeated in FIG. 9D. To this voltage is added a positive d.c. bias voltage from d.c. power supply 128 through resistor 162 to form a voltage wave form 206 which is shifted upward with respect to neutral axis 54.

Voltage wave 206 is applied to diode 164 which provides the positive half cycle as logic signal 208 of FIG. 9E. The commencement of logic signal 208 at time $T_{20}$ is advanced slightly with respect to time $T_3$ as shown in FIG. 9D The amount of this advance may be 20°.

The second input to AND gate 160 is responsive to the presence of current in d.c. supply 10 and thyristor bridge 24. A resistor 168 is inserted in the output of d.c. supply 10 as by interposing it at output terminal 22. Conductor 170 is connected to one end of resistor 168 to sense the voltage signal generated by current flow through resistor 168. Conductor 170 is connected to the second input of AND gate 160 to provide input signal 210.

In the absence of any current in d.c. supply 10, there is no signal in conductor 170 to AND gate 160 and the AND gate is rendered inoperative. No output signal from AND gate 160 is provided to NOR gate 150 and the commencement and termination of the operative period of unijunction transistor 110 is controlled by logic input signal 204 to NOR gate 150. The instant of pulse generation within the operative period is controlled by the rate of charge of capacitor 112.

The presence of current in d.c. supply 10 and in conductor 170 provides an input logic signal 210 shown in FIG. 9F to the input of AND gate 160. This provides an output signal from AND gate 160 to NOR gate 150 in conductor 152 whenever input logic signal 208 is present in conductor 166. This signal commences at time $T_{20}$ and terminates at $T_{21}$. The signal from AND gate 160 to NOR gate 150 does not affect the commencement of the operative period of unijunction transistor 110 at time $T_{18}$. Signal 208 and the output signal of AND gate 160 terminates at time $T_{21}$ which is prior to time $T_{18}$. The removal of the second input signal 202 to NOR gate 150 at time $T_{18}$ causes the output signal to assume a logic state of 1 energizing unijunction transistor 110.

If the magnitude of the input control signal from control signal source 134 is not sufficient to trigger unijunction transistor 110 and fire thyristors 36a and 36b prior to time $T_{20}$ and hence prior to time $T_3$ operation of pulse generator 102 is as follows. At time $T_{20}$, a second input logic signal 208 is applied to AND gate 160 in addition to the current signal in conductor 170. The pair of input signals to AND gate 160 causes the AND gate to generate an output signal in conductor 152 to the input of NOR gate 150. The application of this input signal to NOR gate 150 removes the output signal of the NOR gate and terminates the operative period of unijunction transistor 110 at time $T_{20}$. Prior to time $T_{20}$, a voltage divider consisting of resistors 154 and 156 has charged capacitor 118 to a voltage slightly less than that necessary to trigger unijunction 110 when same is biased by NOR gate 150. At the end of the operative period concluding at time $T_{20}$, the drop in voltage supplied to unijunction transistor 110 by NOR gate 150 causes a drop in the voltage required to trigger unijunction transistor 110 and the voltage across capacitor 118 is now large enough to cause triggering. A firing pulse is thus generated at time $T_{20}$ to thyristors 36a and 36b. Time $T_{20}$ is prior to time $T_3$ and insures that thyristors 36a and 36b will be conducting prior to time $T_3$ when current is present in d.c. supply 10.

The voltage on capacitor 118 also causes unijunction transistor 110 to generate a firing pulse to thyristors 36a and 36b during the normal operation of pulse generator 102 shown in FIG. 9C occurring without current in d.c. supply 12. This causes a firing pulse to be supplied to thyristors 36a and 36b at time $T_{19}$ which is the termination of the normal operative period. As time $T_{19}$ is subsequent to time $T_6$, this has little effect on the operation of thyristor bridge 24.

While control signal source 134 has been shown as an independently controllable element in FIG. 8, it will be appreciated that the signal source will typically include reference and feedback regulating circuitry coupled to the energy source utilization circuitry which adjusts the firing angle of the thyristors in bridge 24 to achieve desired operating conditions in the energy source utilization circuitry. For example, the firing angle of the thyristors may be regulated in accordance with the output voltage of d.c. power supply 12 to provide a level of voltage 50 below which the circuitry will not take power from the power supply. This permits windmill 14 to free wheel at low speed. The current I in the energy source utilization circuitry may be used to regulate thyristor firing angles so as to control the rise in voltage which takes place as the output of power supply 12 increases form zero to maximum current and to establish a current limit to protect generator 12.

Modifications and other Embodiments

It will be appreciated that numerous modifications may be made to the circuitry described above. For example, d.c. generator 12 may be replaced with an alternator 12b having associated rectifying diodes 13 shown in FIG. 1b. Alternators tend to have constant current properties which facilitate the control of current in the energy source utilization circuit. However, it may be necessary to insert an inductance in the d.c. portions of the alternator circuitry to avoid circulating current from the bridge through the rectifying diodes without taking power from the alternator. It may also be necessary to commence the firing of the thyristors in thyristor bridge 24 in the negative portions of the voltage wave, for example, prior to time $T_3$.

The thyristors 34a and 34b and 36a and 36b shown in FIG. 1 may be replaced with other types of current control devices. For example, transistors or triacs may be employed Inasmuch as the control afforded by some of these devices includes a positive means of rendering them nonconductive, such devices may be utilized through the entire power supply interval $T_1 - T_6$, thereby increasing the amount of power supplied to a.c. load 46.

Figure 10:
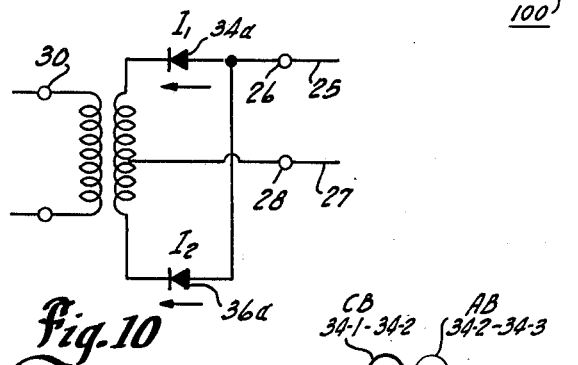
FIG. 10 is a schematic diagram of another embodiment of the switching means of the circuit of the present invention.
Figure 11:
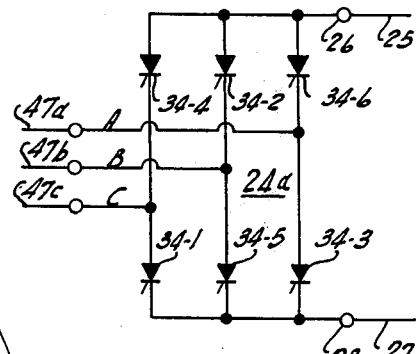
FIG. 11 is a schematic diagram of a polyphase embodiment of the switching means of the circuit of the present invention.

Similarly, various configurations of the switching means 24 may be employed. For example, the common Wheatstone or Graetz Bridge shown in FIG. 1 may be replaced with the center tapped transformer configuration shown in FIG. 10. Elements found in the circuitry of FIG. 1 bear a similar identifying numeral in FIG. 10. Such a configuration has the advantage of a reduction in the number of parts required. If it is desired to utilize additional amounts of power, polyphase power mains 47a, 47b and 47c and polyphase switching means 24a, shown in FIG. 11, may be employed. The bridge includes conductors connecting each of the a.c. power mains to input terminals 26 and 28 of the bridge. Each of the conductors contains a thyristor 34-1 through 34-6.

The operation of polyphase bridge 24a is analogous to that of single phase bridge 24. Sequential conduction by the thyristors in polyphase bridge 24a sequentially applies the line to line voltages between a.c. mains 47a, 47b and 47c to input terminals 26 and 28.

Figure 12:
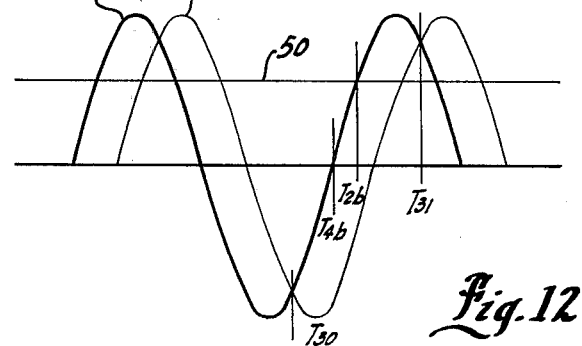
FIG. 12 shows polyphase voltages existing in the embodiment of FIG. 11.

FIG. 12 shows two of the sequential line to line voltages developed in thyristor bridge 24b. One of the line to line voltages is identified as the phase C to phase B line to line voltage, conducted by thyristors 34-1 and 34-2. The succeeding line to line voltage is the phase A to phase B line to line voltage. This voltage is obtained by commutating off thyristor 34-1 and commutating on thyristor 34-3 while continuing the conduction of thyristor 34-2.

As shown in FIG. 12, a power supplying interval $T_{4b}$ to $T_{2b}$ is provided when the phase C to phase B line to line voltage is less than d.c. voltage level 50 but positive with respect to the neutral axis so that the operation of polyphase bridge 24a resembles that of single phase bridge 24.

In regard to the commutation of the thyristors, it will be noted that the phase A to phase B line to line voltage will be less than the phase C to phase B line to line voltage during the interval $T_{30}$ to $T_{31}$. Commutation from the phase C to phase B line to line voltage to the phase A to phase B line to line voltage may occur during this interval and as late as time $T_{31}$. Thus, with a polyphase bridge the interval during which natural commutation may be obtained is at least partially concurrent with the power supplying period. The commutation interval is greater than that found in a single phase bridge, so that the firing control of the thyristors in a polyphase bridge is rendered less critical. A firing circuit, such as that shown in FIG. 8 insures provision of a firing pulse prior to time $T_{31}$ by virtue of the firing pulse generated by capacitor 118.

While FIG. 8 shows a firing circuit which fires each pair of thyristors independently, it is also possible to utilize a firing circuit which applied a single firing pulse to all thyristors simultaneously. Only the thyristors which are most favorable biased for conduction will actually be rendered conductive. This technique has the advantage of requiring only one pulse generator in the firing circuit. However, precautions must be taken to insure that firing pulses are not applied at the crossing of the a.c. voltages, such as the zero crossing at time $T_3$ or $T_4$ in FIG. 3, since this is an indefinite condition in which neither pair of rectifiers is favored for conduction. Also, it is not possible to fire in the positive half cycles of single phase embodiments of the invention since commutation of the thyristors will not be obtained. Firing is limited to the negative half cycles and hence it is preferable to use simultaneous firing of all thyristors with d.c. power supplies, such as d.c. generators which are sufficiently inductive to maintain current flow.

Various modes of carrying out the invention are comtemplated as being within the scope of the following claims particularly pointing out and distinctly claiming the subject matter which is regarded as the invention.

I claim:

1. A geophysical energy source utilization circuit suitable for energizing an a.c. load coupled to a.c. power mains comprising:
   conversion means responsive to the energy of the geophysical source for converting the energy in a corresponding amount of d.c. electrical power having a unipolarity voltage characteristic and for providing same to output terminals of the conversion means;
   switching means having a first terminal means coupled to said output terminals of said conversion means and a second terminal means connectable to said a.c. load and across the a.c. power mains for receiving a periodically varying voltage from the a.c power mains, said switching means including controllable current conduction means interposed between the first and second terminal means for allowing the polarity of the unipolarity voltage to remain unchanged and for conducting current from said first terminal means to said second terminal means; and
   control means coupled to said switching means for rendering said controllable current condition means conductive for establishing a current flow at said second terminal means during periods when the voltage on said second terminal means causes said utilization circuit to comprise an electrical power source for the a.c. load for providing a net supply of power from the utilization circuit to the a.c. load.

2. The circuit according to claim 1 wherein the conduction of current by said controllable current conduction means is responsive to the voltages applied to said first and second terminal means, and wherein said control means is further defined as means for rendering said controllable current conduction means conductive at least when the voltages applied to the said first and second terminal means are such as to cause power supplying current to flow through said conduction means.

3. The circuit according to claim 2 wherein the conduction of current by said controllable current conduction means is responsive to the relative magnitude of the varying and unipolarity voltages and wherein said control means is further defined as means for rendering said conduction means conductive at least when the relative magnitudes of the voltages applied to said first and second terminal means are such as to cause the power supplying current to flow through said conduction means.

4. The circuit according to claim 1 wherein said conversion means is further defined as means for providing direct current electrical power having a unipolarity output voltage less than the peak magnitude of the periodically varying voltage from the a.c. power mains for defining, at least in part, the periods of power supplying current flow.

5. The circuit according to claim 4 wherein said second terminal means receives a bipolarity a.c. voltage from the a.c. power mains and wherein said conversion means is further defined as means for providing direct current electrical power having a unipolarity output voltage less than the peak magnitude of the a.c. voltage of the a.c. power mains for defining, at least in part, the periods of power supplying current flow.

6. The circuit according to claim 5 wherein the voltages on said first and second terminal means cyclically provide a pair of current conducting periods when said utilization circuit may comprise an electrical power source and in which the a.c. voltage is of the same polarity as the unipolarity voltage and of a magnitude less than the unipolarity voltage but greater than zero, in a first of the periods the a.c. voltage is decreasing toward zero and in the second of the periods the a.c. voltage is increasing with respect to zero, and wherein said control means, is further defined as means for rendering said controllable current conduction means conductive in at least one of the power supplying periods.

7. The circuit according to claim 5 wherein said control means is further defined as means for rendering said controllable current conduction means conductive in the second of the power supplying periods.

8. The circuit according to claim 5 wherein said switching means includes at least a pair of controllable current conduction means interposed between said first and second terminal means and coupled to said control means, said pair of current conduction means forming at least a pair of current conduction paths between said first and second terminal means, and wherein said control means is further defined as means for sequentially rendering the conduction means in each of said paths conductive.

9. The circuit according to claim 8, wherein the sequential operation of said current conduction means establishes a plurality of bi-polarity a.c. voltages in said switching means; wherein the unipolarity and the a.c. voltages cyclically provide a pair of current conducting periods for each of said paths when said utilization circuit may comprise an electrical power source, in which periods an a.c. voltage is of the same polarity as the unipolarity voltage and of a magnitude less than the unipolarity voltage but greater than zero, in the first of the periods of the pairs, the a.c. voltage is decreasing toward zero and in the second of the periods of the pairs, the a.c. voltage is increasing with respect to zero; and wherein said control means is further defined as means for rendering said controllable current conduction means in each of said paths conductive in at least one of the power supplying periods.

10. The circuit according to claim 9 wherein said control means is further defined as means for rendering said controllable current conduction means in each of said paths conductive in the second of the power supplying periods.

11. The circuit according to claim 9 wherein said control means is further defined as means for rendering said controllable current conduction means conductive prior to the commencement of the second of the power supplying periods.

12. The circuit according to claim 10 wherein said current conduction means in said current conduction paths are sequentially commutatable during commutation intervals established by the a.c. voltages in said switching means, in which commutation intervals the conduction means in one of ssid paths is conductive and the conduction means in the other of said paths is voltage biased for potential conduction, and wherein said control means is further defined as means for rendering the potentially conductive current conduction means conductive in the appropriate commutation interval.

13. The circuit according to claim 12 wherein a commutation interval precedes a power supplying period and said control means is further defined as means for rendering the potentially conductive current conduction means conductive in the commutation interval prior to the power supplying period.

14. The circuit according to claim 12 wherein the commutation interval and a power supplying period are at least partially concurrent and said control means is further defined as means for rendering the current conduction means conductive in the commutation interval.

15. The circuit according to claim 12 wherein said control means is further defined as including means for sensing current in said conversion means and for rendering the potentially conductive current conduction means conductive in the appropriate commutation interval at least under conditions in which current is present in the commutation interval.

16. The circuit according to claim 7 wherein said first terminal means comprises a first pair of terminals and said second terminal means comprises a second pair of terminals connectable to the a.c. load and across the a.c. power mains, wherein said switching means comprises a bridge having bridge arm conductors connecting each of the terminals of said first pair with each of the terminals of said second pair, said bridge arm conductors containing complementary pairs of controllable current conduction devices for providing said pair of current conduction paths and wherein said control means is coupled to said complementary pairs of current conduction devices.

17. The circuit according to claim 8 wherein said first terminal means comprises a first pair of terminals and said second pair of terminals comprises a second pair of terminals connectable to the a.c. load and across the a.c. power mains and wherein said switching means includes a center tapped transformer having one winding connected across said second pair of terminals, the ends of the center tapped winding of said transformer containing said current conduction means and being connected together and to one of said first pair of terminals, and the center tap of said transformer being connected to the other of said first pair of terminals, said current conduction means being coupled to said control means.

18. The circuit according to claim 8 wherein said first terminal means comprises a first pair of terminals and said second terminal means comprises a plurality of terminals connectable to an a.c. load and across polyphase a.c. power mains and wherein said switching means includes a polyphase bridge having bridge arm conductors connecting each of the terminals of said first pair with each of the terminals of said second terminal means, said bridge arm conductors containing controllable current conduction devices for providing a plurality of current conduction paths in said polyphase bridge, and wherein said controllable current conduction devices are coupled to said control means.

19. The circuit according to claim 3 wherein said controllable current conduction means comprises thyristor means having power curcuitry connected between said first and second terminal means and control circuitry coupled to said control means.

20. The circuit according to claim 19 wherein said control means comprises a firing circuit coupled to said control circuitry of said thyristor means.

21. The circuit according to claim 5 wherein said control means is responsive to the unipolarity output voltage of said conversion means for establishing the current flow in said switching means responsive to the magnitude of the unipolarity output voltage.

22. The circuit according to claim 1 wherein said control means is responsive to the magnitude of said current flow for regulating the operation of the current conduction means in accordance therewith.

23. The circuit according to claim 1 wherein said conversion means is responsive to the wind.

24. The circuit according to claim 23 wherein said conversion means includes an electro-mechanical power supply means driven by the wind for providing the d.c. electrical power.

25. The circuit according to claim 24 wherein said electro-mechanical power supply means comprises a d.c. generator.

26. The circuit according to claim 24 wherein said electro-mechanical power supply means comprises an alternator having associated therewith means for providing a rectified output.

27. The circuit according to claim 1 wherein said conversion means is responsive to solar energy.

28. The circuit according to claim 1 wherein the a.c. load is included as an element of the circuit whereby the a.c. power mains supply or absorb the net power difference between the power provided by said utilization circuit and that required by the a.c. load.

29. A method of utilizing a geophysical energy source to power an a.c. load coupled to a.c. power mains providing a periodically varying voltage, said method comprising the steps of:
converting the energy of the geophysical energy source in a corresponding amount of d.c. electrical power having unipolarity voltage and current properties;
determining, by means of the electrical characteristics if the d.c. power obtained by conversion and of the a.c. power mains, periods during which transfer of the d.c. power to the a.c. load may occur; and
transferring power to at least one of the a.c. load and a.c. mains during such periods in accordance with the instantaneous amount of power available from the geophysical energy source.

30. The method according to claim 29 wherein the power transferring step is further defined as conducting current to at least one of the a.c. load and a.c. mains during such periods to transfer the power.

31. The method according to claim 30 wherein the unipolarity voltage is less than the peak magnitude of the periodically varying voltage and the determination of the power supplying current conduction periods is further defined as determining periods when the varying voltage is of the same polarity as the unipolarity voltage end of a magnitude less than the unipolarity voltage but greater than zero and the conduction step is further defined as conducting current during such periods.

32. The method according to claim 31 wherein the determination step identifies cyclical power supplying current conduction periods and wherein the current conducting step is further defined as conducting current in at least selected ones of said periods.

33. The method according to claim 31 wherein the a.c. power mains provide a bi-polarity a.c. voltage and the determination step identifies a cyclical pair of power supplying current conducting periods, in the first of the periods the a.c. voltage is decreasing towards zero and in the second of the periods the a.c. voltage is increasing with respect to zero, and wherein the current conducting step is further defined as conducting current in at least one of said first and second periods.

34. The method according to claim 33 wherein the current conducting step is further defined as conducting current in the second of said periods.

35. The method according to claim 33 wherein a plurality of bipolarity a.c. voltages are derivable from the a.c. power mains and the determination step identifies pluralities of pairs of first and second current conducting periods.

36. The method according to claim 35 wherein the current conducting step is further defined as conducting current in the second of the periods of said pairs.

37. The method according to claim 32 is further defined as initiating the conduction of current prior to the commencement of the second of the periods of said pairs.

38. The method according to claim 35 wherein the current is sequentially commutatable among the plurality of a.c. voltages during commutation intervals established by the voltages and wherein the current conducting step is further defined as commutating the current among the a.c. voltages in the commutation intervals.

39. The method according to claim 38 wherein a commutation interval precedes a power supplying period and the current conducting step is further defined as commutating the current in the commutation interval prior to the power supplying period.

40. The method according to claim 38 wherein a commutation interval and a power supplying period are at least partially concurrent and wherein the current conducting step is further defined as commutating the current in the commutation interval.

41. The method according to claim 38 further including the step of sensing the presence of current and wherein the current conducting step is further defined as commutating current among the a.c. voltages in the commutation intervals at least when current is present during the commutation intervals.

42. The method according to claim 29 including a step of sensing the unipolarity output voltage for conducting current responsive to the magnitude of the unipolarity voltage.

43. The method according to claim 29 including the step of sensing the magnitude of the current and regulating the current conduction in accordance therewith.

44. The method according to claim 29 further defined as utilizing a source of wind energy wherein the conversion step is further defined as converting the energy of the wind into a corresponding amount of d.c. electrical power.

45. The method according to claim 29 further defined as utilizing a source of solar energy wherein the step of converting the energy is further defined as converting the solar energy of a corresponding amount of d.c. electrical power.

46. The method according to claim 29 further defined as supplying or absorbing with the a.c. power mains the net difference between the power available from the geophysical energy source and that required by the a.c. load.

* * * * *

UNITED STATES PATENT AND TRADEMARK OFFICE
CERTIFICATE OF CORRECTION

PATENT NO. : 3,946,242
DATED : March 23, 1976
INVENTOR(S) : ALAN W. WILKERSON

It is certified that error appears in the above-identified patent and that said Letters Patent are hereby corrected as shown below:

Patent col. 3 line 46 after "36b" insert ---and 36a---

Patent col. 3 line 47 delete "the a and 36b" and substitute therefor ---the two---

Patent col. 4 line 31 "pwer" should be ---power---

Patent col. 4 line 34 after "polarity" insert a period (.)

Patent col. 4 line 64 "tl" should be ---$T_1$---

Patent col. 5 line 6 delete "Bridge terminal 38 and 40."

Patent col. 7 line 28 "that" before "anode" should be ---the---

Patent col. 10 line 53 "manner" should be ---matter---

Patent col. 12 line 43 the title should be in caps

UNITED STATES PATENT AND TRADEMARK OFFICE
CERTIFICATE OF CORRECTION

PATENT NO. : 3,946,242
DATED : March 23, 1976
INVENTOR(S) : ALAN W. WILKERSON

It is certified that error appears in the above-identified patent and that said Letters Patent are hereby corrected as shown below:

Patent col. 12 line 61 after "employed" insert a period (.)

Patent col. 13 line 5 "Sucn" should be ---Such--- col. 15 line 19 should be dependent on "6" not "5"

col. 15 line 65 "ssid" should be ---said--- col. 16 line 13 before "current" insert ---potentially conductive--- col. 16 line 23 should be dependent on "8" not "7"

col. 16 line 39 after "second" in the first occurrence delete "pair of terminals" and substitute therefor ---terminal means--- col. 18 line 21 should be dependent on "36" not "32"

UNITED STATES PATENT AND TRADEMARK OFFICE
CERTIFICATE OF CORRECTION

PATENT NO. : 3,946,242

DATED : March 23, 1976

INVENTOR(S) : ALAN W. WILKERSON

It is certified that error appears in the above-identified patent and that said Letters Patent are hereby corrected as shown below:

col. 18   line 28   after "voltages" and before "and" insert a comma --- , --- col. 18   line 61   after "energy" delete "of" and substitute therefor ---into---

Signed and Sealed this

Seventh Day of February 1978

[SEAL]

Attest:

RUTH C. MASON
*Attesting Officer*

LUTRELLE F. PARKER
*Acting Commissioner of Patents and Trademarks*